United States Patent
Hamada et al.

[11] Patent Number: 6,059,175
[45] Date of Patent: May 9, 2000

[54] METHOD FOR JOINING METALLIC MATERIALS BY DIFFUSION BONDING AND JOINED STRUCTURE THEREBY

[75] Inventors: Masahiko Hamada, Amagasaki; Yasuto Fukada, Hachioji; Masakatsu Ueda, Tawaramotocho; Yuuichi Komizo, Nishinomiya, all of Japan

[73] Assignee: Sumitomo Metal Industries, Ltd., Osaka, Japan

[21] Appl. No.: 08/999,602

[22] Filed: Nov. 28, 1997

Related U.S. Application Data

[63] Continuation of application No. PCT/JP97/01069, Mar. 27, 1997.

[30] Foreign Application Priority Data

| Mar. 29, 1996 | [JP] | Japan | 8-075590 |
| Mar. 29, 1996 | [JP] | Japan | 8-075687 |

[51] Int. Cl.[7] .................................................. B23K 20/00
[52] U.S. Cl. .................................... 228/194; 228/234.1
[58] Field of Search .................... 228/193–195, 228/234.1, 219

[56] References Cited

U.S. PATENT DOCUMENTS

| 3,678,570 | 7/1972 | Paulonis et al. | 228/194 |
| 4,700,881 | 10/1987 | Ryan | 228/194 |
| 5,005,756 | 4/1991 | Muggeo et al. | 228/127 |
| 5,084,956 | 2/1992 | Saito et al. | 29/602.1 |
| 5,118,028 | 6/1992 | Ogawa et al. | 228/194 |
| 5,584,428 | 12/1996 | Satoh et al. | 228/194 |

FOREIGN PATENT DOCUMENTS

| 49-10849 | 1/1974 | Japan . |
| 55-57388 | 4/1980 | Japan . |
| 56-19990 | 2/1981 | Japan . |
| 57-75292 | 5/1982 | Japan . |
| 62-187580 | 8/1987 | Japan . |
| 2-75478 | 3/1990 | Japan . |
| 5-77063 | 3/1993 | Japan . |
| 5-161984 | 6/1993 | Japan . |
| 5-169280 | 7/1993 | Japan . |
| 5-220585 | 8/1993 | Japan . |
| 6-7967 | 1/1994 | Japan . |

*Primary Examiner*—Patrick Ryan
*Assistant Examiner*—Kiley Stoner
*Attorney, Agent, or Firm*—Armstrong, Westerman, Hattori, McLeland & Naughton

[57] ABSTRACT

The present invention provides (1) diffusion bonding methods for joining metallic materials like carbon steels or stainless steels, interposing a bonding material, such as 10 to 80 μm thick Ni-based alloy with the melting point of 1150° C. or lower, between base materials, heating so that the length heated at 800° C. or above measures from 3 to 20 mm, in case of joining stainless steels a bonded layer, further, being heated between the both melting points, and applying the compressive stress, for example 0.5 to 2 kgf/mm², so that a lateral expansion ratio is made within 1.0 to 1.1, and (2) a joined structure having the bonded joint formed thereby.

12 Claims, 7 Drawing Sheets fig. 3

| test number | lateral expansion ratio | heated length (mm) | TS of bonded joint (MPa) [ break location ] | bending test | fatigue life (number of cycle) | classification |
|---|---|---|---|---|---|---|
| 1 | 1.04 | 17 | 866 base metal | ○ | 3.22×10⁷ | invention |
| 2 | 1.08 | 17 | 870 base metal | ○ | 3.62×10⁷ | invention |
| 3 | 1.23* | 16 | 868 base metal | ○ | 3.06×10⁶ | comparison |
| 4 | 1.08 | 35* | 787 bond joint | ○ | 9.32×10⁶ | comparison | note: figures marked with *. denote the outside of the limited range of the invention.

Fig. 4

| sign of insert material | chemical composition (wt%) | | | | | melting point (°C) |
|---|---|---|---|---|---|---|
| | Si | B | Ni | Cr | Mo | |
| 1-1 | 7.5 | 1.5 | 72 | 19 | - | 1140 |
| 1-2 | 7.0 | 2.0 | 68 | 20 | 3 | 1130 |

Fig. 5

| pipe mark | chemical composition (wt%) | | | | | | | | | | | melt T °C | Y.S. MPa |
|---|---|---|---|---|---|---|---|---|---|---|---|---|---|
| | C | Si | Mn | P | S | Cu | Ni | Cr | Mo | W | N | | |
| M1 | 0.12 | 0.49 | 0.41 | 0.022 | 0.002 | - | 0.11 | 9.20 | 0.95 | - | 0.008 | 480 | 565 |
| M2 | 0.21 | 0.61 | 0.64 | 0.017 | 0.003 | - | 0.12 | 12.66 | - | - | 0.007 | 500 | 576 |
| M3 | 0.015 | 0.13 | 0.44 | 0.016 | 0.001 | - | 5.80 | 12.12 | 2.05 | - | 0.006 | 490 | 673 |
| S1 | 0.02 | 0.53 | 1.62 | 0.028 | 0.001 | 0.09 | 5.48 | 22.34 | 3.02 | - | 0.130 | 470 | 480 |
| S2 | 0.02 | 0.41 | 1.02 | 0.023 | 0.001 | 0.50 | 6.77 | 25.16 | 3.16 | 0.27 | 0.129 | 460 | 570 |
| S3 | 0.015 | 0.33 | 0.52 | 0.015 | 0.004 | 0.51 | 6.85 | 24.65 | 3.11 | 2.10 | 0.260 | 410 | 594 |

Fig. 6

| test No. | insert materials mark μm | pipe mark | heated length (mm) | heated temp. bonded layer (°C) | heat ret. time (s) | compressive stress (kgf/mm²) | stress apply method | YS | bend test | corrosion test |
|---|---|---|---|---|---|---|---|---|---|---|
| A1 | I-1  30 | M1 | 15 | 1250 | 300 | 1 | (A) | Yes | Yes | Yes |
| A2 | I-1  30 | M2 | 18 | 1200 | 300 | 1 | (A) | Yes | Yes | Yes |
| A3 | I-1  30 | M3 | 18 | 1150 | 300 | 1 | (B) | Yes | Yes | Yes |
| A4 | I-1  30 | S1 | 17 | 1200 | 300 | 1 | (B) | Yes | Yes | Yes |
| A5 | I-1  30 | S2 | 12 | 1200 | 300 | 1 | (A) | Yes | Yes | Yes |
| A6 | I-1  30 | S3 | 15 | 1200 | 300 | 1 | (A) | Yes | Yes | Yes |
| A7 | I-2  30 | M2 | 16 | 1250 | 300 | 1 | (A) | Yes | Yes | Yes |
| A8 | I-2  30 | S2 | 17 | 1250 | 300 | 1 | (A) | Yes | Yes | Yes |
| B1 | I-1  30 | M2 | 17 | 1250 | 300 | *3.0 | (A) | Yes | No | No |
| B2 | I-1  30 | M2 | *28 | 1250 | 300 | 1 | (B) | No | Yes | No |
| B3 | I-1  30 | M2 | 18 | *950 | 300 | 1 | (A) | No | No | No |
| B4 | I-2  30 | S2 | 17 | 1500 | *100 | 1 | (B) | No | No | No |
| B5 | I-1  30 | S2 | 17 | 1250 | 300 | *0.2 | (A) | No | No | No |
| B6 | I-2 *120 | S2 | 18 | 1250 | 300 | 1 | (A) | No | No | No | note 1) Test A1~A8 are the examples of the invention, while B1~B6 are those for the comparison.

2) Figures attached with mark* denote the outside of the limited range of the invention.

3) "yes" in YS means the higher value than YS of base metal (Fig.5), and "yes" in bend and corrosion test means "no break".

t : wall thickness of pipe

Fig. 8
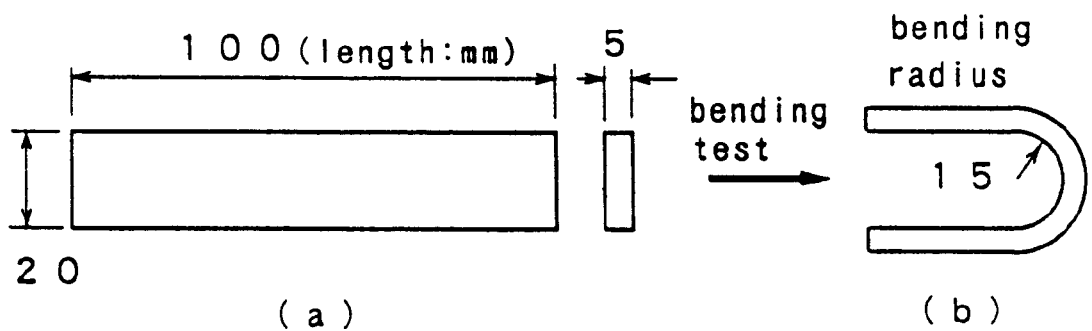
(a) (b)
Fig. 9
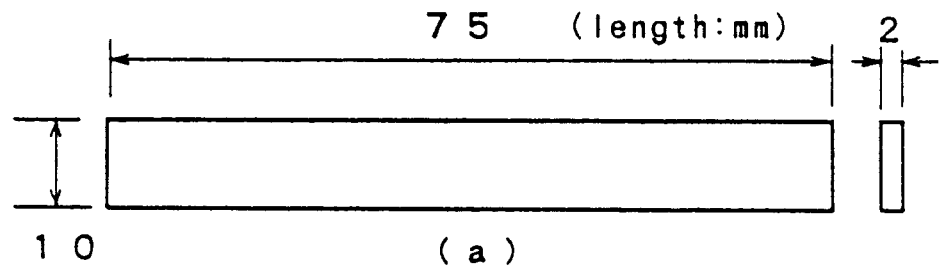
(a)
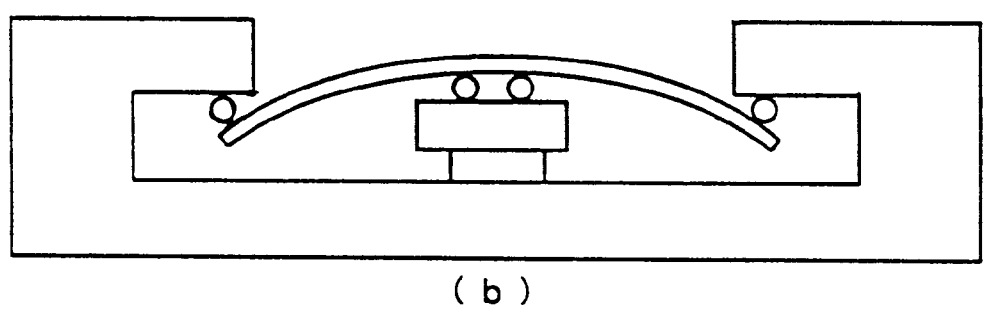
(b)

6,059,175

METHOD FOR JOINING METALLIC MATERIALS BY DIFFUSION BONDING AND JOINED STRUCTURE THEREBY

This application is a continuation of International Application No. PCT/JP97/01069, filed Mar. 27, 1997, and claiming priority based on Japanese Patent Applications Nos. 8-75590 and 8-75687 both filed Mar. 29, 1996.

TECHNICAL FIELD

The present invention relates to a method for joining metallic structural members such as stainless steels, and the like, which are highly corrosion resistant in a humid $CO_2$ environment containing a trace of $H_2S$, and particularly, a method for joining oil countries tublar goods including coiled tubing.

BACKGROUND TECHNOLOGY

A method for joining metallic materials by diffusion bonding has recently attracted much attention because of its characteristics that the bonded joint is not susceptible to degradation in quality and bonding is achieved easily without affecting the qualities of materials bonded. Hence, a number of inventions related thereto have been disclosed (for example, Japanese Patent Laid-open Publication No. Hei 6-7967, Hei 5-169280, Hei 5-161984, Hei 5-77063, Hei 5-220585, Hei 2-75478 etc.). In this description, "metallic materials" and "base materials" referred to hereinafter mean the same object.

Among the methods of diffusion bonding described above, a method disclosed in Japanese Patent Publication Laid-open Hei 2-75478 may replace a conventional press welding with gas flame heating wherein base materials undergo substantial plastic deformation. The disclosed method of diffusion bonding is characterized by a relatively low bonding temperature and small plastic deformation at a bonded joint.

Since said diffusion bonding method is capable of restraining plastic deformation at the bonded joint, it can prevent a decline in fatigue strength accompanying the excessive expansion at the bonded joint, or a cracking in concrete induced after the bonded joint is covered up with concrete. Thus said method provides some improvement in the property at the bonded joint as described above in comparison with the conventional press welding with gas flame heating. However, some aspects of the property at the bonded joint formed by this method, in particular, fatigue strength, are not acceptable. Hence, it is highly desired that the property of the bonded joint be enhanced by further improving the expanded shape at the bonded joint.

Japanese Patent Laid-open Publication No. Hei 5-220585 discloses a method of rectifying the expanded shape of the bonded joint by combining diffusion bonding with arc welding to enhance the fatigue strength to meet the requirement above. The method, however, has a weakness of poor economics, since after diffusion bonding, the arc welding needs to be additionally applied. Therefore, a simpler method to improve the property of the bonded joint is desired.

The methods for joining described above,may not be appropriate for the specified service environment in which the bonded joint is exposed. Hereafter, a case where environmental embrittlement due to corrosion in a specific environment which may pose a problem, is described.

A humid $CO_2$ gas environment is a very important environment in which materials are necessarily subjected when oil is handled by various sectors such as oil well drilling, pumping, transportation, and refining of oil. From the viewpoint of corrosion, the humid $CO_2$ gas environment can be, in a broad sense, classified into two; that is, an environment wherein only humid $CO_2$ gas exists and an environment wherein humid $CO_2$ gas and a trace of $H_2S$ co-exist. The method according to this invention is intended to be applied to the structures exposed to both environments. Accordingly, "a humid $CO_2$ gas environment containing a trace of $H_2S$" referred to hereafter in this description includes "a humid $CO_2$ environment not containing $H_2S$".

There has been a strong demand for materials which are corrosion resistant in the humid $CO_2$ environment containing a trace of $H_2S$. So, various materials suited for use in the above described environment, particularly a variety of stainless steels and high alloyed steels, have been developed.

In the case of using ordinary welding methods for bonding stainless steels and the like, the following problems arise due to the fusion of the base materials:

(1) In the case of a martensitic stainless steel, weld metal and heat affected zones are hardened as quenched, and consequently, toughness is degraded and cracking resistance in the humid $CO_2$ environment containing a trace of $H_2S$ is impaired.

(2) In the case of an austenitic-ferritic stainless steel (hereinafter referred to as a duplex stainless steel), a proportion of ferrite in weld metal goes up, resulting in the degradation of toughness and corrosion resistance.

In comparison with such welding methods, the method of diffusion bonding is advantageous in the low density of input energy.

Normally, for connection of drilling pipes and the like made of stainless steel or high alloyed steel, a threaded connection composed of steel members are used. In case that the steel members composing the threaded connection are themselves corrosion resistant in a service environment, the threaded connection has sufficient corrosion resistance. However, there are following problems in the method of using the threaded connection.

(a) Cutting threads with high precision is required, involving a high cost.

(b) It is no easy job to connect the threaded connection always with even force, and the skill of workers is required to secure reliability of the threaded connection.

(c) Threaded portions are prone to be damaged during transportation.

Among the methods of diffusion bonding described above, the method disclosed in Japanese Patent Laid-open Publication No. Hei 6-7967 is a method of diffusion bonding of high alloyed steel, and capable of replacing the threaded connection by preventing the degradation in quality. In this method, plastic work-hardening is applied to the ends of pipes in advance to counter the softening occurring E during heating of diffusion bonding. However, the method has a drawback of high cost resulting from the prior plastic working at the end of the base materials.

Thus it can be said that there has never been disclosed a method of diffusion bonding capable of providing a bonded joint having high fatigue strength, and sufficient corrosion resistance in the humid $CO_2$ gas environment containing a trace of $H_2S$.

It is a primary object of the invention to provide the following method of diffusion bonding, and a joined structure with a diffusion bonded joint formed thereby:

(1) a method for joining metallic materials by diffusion bonding for providing a bonded joint, having such a fatigue strength, bond strength, and bendability as equivalent to or in excess of those of the base material.

(2) a method for joining stainless steels by diffusion bonding for providing a bonded joint having high corrosion resistance and maintaining sufficient mechanical properties in a humid $CO_2$ gas environment containing a trace of $H_2S$.

DISCLOSURE OF THE INVENTION

FIG. 1 is a schematic view of a bar or tubing in the vicinity of a joint bonded by a method of diffusion bonding according to the invention. Herein, the bonded joint 3 is defined by a heat affected zone, and a heated length 2 refers to a portion heated at 800° C. and above, in the heat affected zone. The bonded joint 3 and the heated length 2 are substantially symmetrical with respect to a bonded layer 1 described hereafter. A diffusion layer 4 refers to a layer where as a result of diffusion bonding, alloying elements contained in a low-melting bonding material described hereafter penetrate into the end surfaces of the base materials, and diffuse therein. Hereafter, "the low-melting bonding material" is referred to merely as "bonding material".

The bonded layer 1 consists of layers including the diffusion layers 4 at the end surfaces of the base materials on both sides thereof with the content-changed bonding material interposed therebetween. Hence, the bonded layer consists of the diffusion layer, the content-changed bonding material, and the diffusion layer. Thus, the bonded layer refers to a zone where diffusion bonding effectively occurs. A material having a melting point lower than that of the base materials is selected as the bonding material.

Herein, "%" expressing content of alloying element always denotes "wt %".

The method for joining metallic materials by diffusion bonding according to the invention has been accomplished by bonding bars, pipes, plates, and the like, made of carbon steel, low alloy steel, stainless steel, and the like, using a self-made diffusion bonding apparatus described hereinafter, and then by examining the characteristics of the joint formed thereby.

The gist of the invention includes the methods for joining metallic materials as described hereunder and the joined structure with the bonded joint formed thereby (refer to FIG. 1).

(1) A method for joining metallic materials by diffusion bonding to form the bonded joint having excellent fatigue strength and bonding strength, wherein the base materials butted against each other with the bonding material interposed therebetween is heated so that the length heated at a temperature of 800° C. or above measures from 3 to 20 mm, and the compressive stress is applied in the longitudinal direction 5 of the base materials so that plastic deformation is caused to occur with a lateral expansion ratio in the range of 1.0~1.1 at the bonded joint (hereinafter referred to as [Invention 1]).

(2) A method for joining metallic materials by diffusion bonding according to Invention 1 to form the bonded joint having excellent fatigue strength, corrosion resistance in the humid $CO_2$ environment containing a trace of $H_2S$ and bonding strength, wherein a stainless steels containing min. 9 wt % of Cr is used for the base material 12, Ni-based alloy 10 to 80 µm thick containing min. 5 wt % of Cr and having a melting point at 1150° C. or lower is used for the bonding material, a compressive stress applied in the longitudinal direction of the base materials is in the range of 0.5 to 2 kgf/mm² at the butted surfaces of the base materials and a temperature at the bonded layer 1 is held in the range between the melting point of the bonding material and the melting point of the base materials for a retention time of 120 seconds or longer (hereinafter referred to as [Invention 2]).

(3) A joined structure, having the bonded joint formed by the method according to invention 1 (hereinafter referred to as [Invention 3]).

(4) A joined structure, having the bonded joint formed by the method according to invention 2 (hereinafter referred to as [Invention 4]).

(5) A method for joining metallic materials according to Invention 1, wherein an insert material, which is composed of a metallic crystalline strip or a metallic amorphous strip is used as the bonding material (hereinafter referred to as [Invention 5]).

(6) A method for joining stainless steels according to Invention 2, wherein an insert material, which is composed of a metallic crystalline strip or a metallic amorphous strip is used as the bonding material (hereinafter referred to as [Invention 6]).

(7) A method for joining metallic materials according to Invention 1, wherein the compressive stress is applied by clamping the both base materials 12 and adjusting the reaction force accompanying the thermal expansion by the use of the spring (hereinafter referred to as [Invention 7]).

(8) A method for joining stainless steels according to Invention 2, wherein the compressive stress is applied by clamping the both stainless steels 12 and adjusting the reaction force accompanying the thermal expansion by the use of the spring (hereinafter referred to as [Invention 8]).

(9) A method for joining metallic materials according to Invention 1, wherein the compressive stress is applied by the use of the oil pressure (hereinafter referred to as [Invention 9]).

(10) A method for joining stainless steels according to Invention 2, wherein the compressive stress is applied by the use of the oil pressure (hereinafter referred to as [Invention 10]).

(11) A method for joining metallic materials according to Invention 1, wherein diffusion bonding is performed in an atmosphere of either an inert gas, a nitrogen gas or a mixture of the both gases (hereinafter referred to as [Invention 11]).

(12) A method for joining stainless steels according to Invention 2, wherein bonding is performed in an atmosphere of either an inert gas, a nitrogen gas or a mixture of the both gases (hereinafter referred to as [Invention 12]).

In carrying out the method of diffusion bonding according to Invention 1 or Invention 2, what is known as insert material such as a thin alloy strip, and the like, irrespective of whether same is amorphous or crystalline, is most often used as the bonding material. However, the bonding material may not be limited to a material separated from the base material, such as the insert material. For example, the bonding material may be a material adhered in advance to the end surfaces of the respective base materials, such as a plated film, plasma sprayed film, and the like. An insert material may be in advance fixed to the end surfaces of the respective base materials by spot welding, forged bonding, or the like.

Expression, "interposing the bonding material between base materials", refers to a condition wherein the bonding material is sandwiched between the base materials in the case of using the insert material, and a condition wherein same is present between the base materials in case of using the plated film, the plasma sprayed film or the like.

"lateral expansion" refers to an increase in the diameter of a bar, or an increase in the outside diameter of a pipe, and "lateral expansion ratio" a ratio of the increase in the respective cases. In other words, in the case of a bar, same refers to {(the maximum diameter of the bar at the bonded joint after bonding)—(the diameter thereof before bonding)

}/(the diameter of the bar before bonding). The same formula applies to the case of a pipe provided that "diameter" is to be superseded by "outside diameter".

Referring to signs in FIG. 1, the lateral expansion ratio is expressed by (Tmax−t)/t. In the case of a bar or pipe, an increase in the diameter or outside diameter, respectively, does not necessarily take place symmetrically with respect to the axis thereof. Hence, the lateral expansion ratio is determined on the basis of the maximum diameter or the maximum outside diameter, respectively.

The method for joining according to Invention 1 includes both a method of liquid-state diffusion bonding effected with the bonding material in molten state and a method of solid-state diffusion bonding effected with the bonding material kept in a temperature range below its melting point. On the other hand, in the method according to Invention 2, liquid-state diffusion bonding is effected by heating to a melting temperature of the bonding material or above. More specifically, in the method of Invention 2, diffusion bonding is achieved as a result of a phenomenon wherein alloying elements in the molten bonding material diffuse into a stainless steel while alloying elements in the stainless steel diffuse into the molten bonding material, resulting in a rise in a melting point of a molten phase and thereby causing the molten phase to be solidified. Said method too is referred to as "method of diffusion bonding" instead of "method of liquid-state diffusion bonding".

In carrying out Invention 1, metallic materials in general can be used for the base material. In the case of the base material being a steel member, the frequency of the application of the invention and practical merits thereof increase. The base material may be a pipe, bar, plate, or the like without any restriction on the shape thereof. In FIG. 1, a case of the base material being a bar or pipe is illustrated, however, similar description can be applied to a case of a plate or the like. In the case of a plate, thickness thereof corresponds to the diameter of a bar. In the case of a pipe, not only a straight pipe but also coiled tubing in a coiled form may be included. For the coiled tubing as base material, an insert material is mostly used as the bonding material.

In carrying out Invention 2, a stainless steel used as the base material is a martensitic or a duplex stainless steel. The stainless steel member is mainly in the form of a pipe, in particular, oil countries tubular goods, however, not limited to a pipe, and may be in the form of a bar, shape, or plate. In the oil countries tublar goods, the straight pipe and the pipe in a coiled form known as coiled tubing are included similarly in the case of Invention 1.

Invention 3 or Invention 4 relates to a joined structure having the diffusion bonded joint formed by the method according to Invention 1 and Invention 2, respectively. Herein, the joined structure refers to a structure made of diffusion bonded pipes, plates, bars and the like, in particular, straight pipes, or coiled tubing.

"Heated length" refers to a portion heated at 800° C. and above, and a measurement method thereof is described hereafter.

BRIEF DESCRIPTION OF THE DRAWINGS

FIG. 3 is a table showing results of tests on diffusion bonding according to the first embodiment of the invention.

FIG. 4 is a table showing chemical compositions and melting points of insert materials used in the method of diffusion bonding according to the second embodiment of the invention.

FIG. 5 is a table showing chemical compositions, melting points, and yield strengths of pipes diffusion bonded according to the second embodiment.

FIG. 6 is a table showing the conditions of diffusion bonding and test results of the second embodiment.

FIG. 8(a) is a view showing a testpiece used in a bending test carried out on the bonded joint.

FIG. 8(b) is a view showing the testpiece after the bending test.

FIG. 9(a) is a view showing the shape of a testpiece used for a corrosion cracking test.

FIG. 9(b) is a sectional view showing the testpiece loaded with a stress, and a jig used for the test.

BEST FORM FOR CARRYING OUT THE INVENTION

Figure 1:
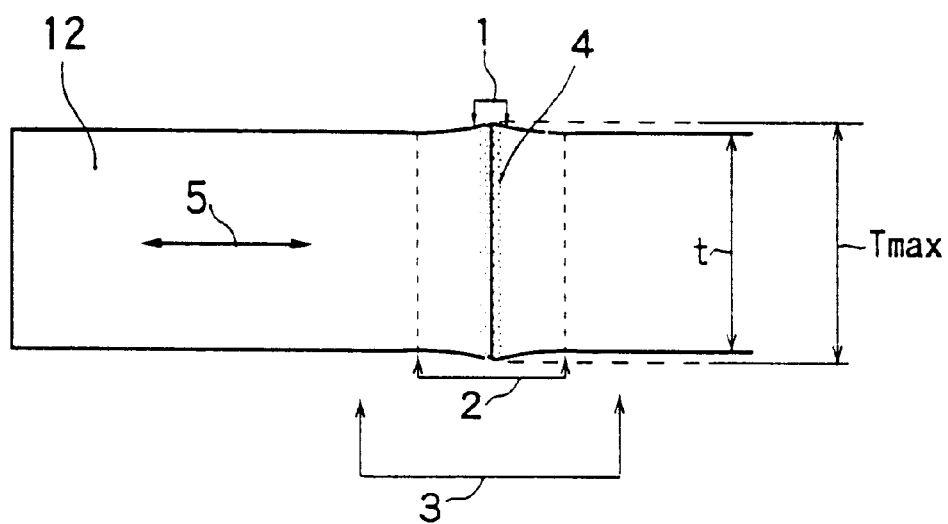
FIG. 1 is a schematic representation illustrating a bonded joint of bars or pipes by diffusion bonding according to Invention 1 or Invention 2. Reference numeral 1 denotes a bonded layer, 2 a heated length, 3 the bonded joint, 4 a diffusion layer, and 5 the longitudinal direction of a base material, and Tmax denotes "the maximum diameter of the bonded joint" or "the maximum outside diameter of the bonded joint", while t denotes the diameter or outside diameter of the base material.

The inventor et. al. have noticed that there are cases where rupture of base materials occurs even without a pronounced increase in the diameter of a bonded joint of bars or pipes. In other words, sufficient bond strength is obtained at the bonded joint, and subsequently, carried out tests on pipes and bars to elucidate the causes for such a phenomenon. After confirming the facts as itemized hereafter, Invention 1 has been accomplished.

(1) Even in case that a ratio of an increase in the diameter of bars at a bonded joint is made within a very small range, the effect of softening at the bonded joint is limited and rupture at the base materials occurs in a tensile test, provided that a length heated at 800° C. or above, that is, a heated length remains in a limited range.

(2) In the case of a pipe, observable plastic deformation takes the form of an increase in the outside diameter of the pipe.

Similarly to the case of a bar, a ratio of an increase in the outside diameter of the pipe is made within a very small range, a sufficiently high bonding strength is achieved by keeping the length heated at 800° C. or above within a limited range in the axial direction of the pipe (also referred to as a heated length).

(3) In case that a lateral expansion ratio is minuscule, the stress concentration occurring at the bonded joint is not intense, and both fatigue strength and bendability of the bonded joint become equivalent to those of the base material.

(4) In the case of a pipe with the lateral expansion ratio in a very small range, the fluid does not stagnate in close vicinity of the bonded joint for an extended length of time. Hence, a very small lateral expansion ratio is desirable from the viewpoint of corrosion protection.

The inventor et. al. carried out further studies on application of the method according to Invention 1 with an aim to ensure sufficient corrosion resistance in an humid $CO_2$ gas environment containing a trace of $H_2S$. As a result, the following points have been confirmed, and Invention 2 has been accomplished:

(a) Corrosion resistance of the bonded joint in a humid $CO_2$ gas environment containing a trace of $H_2S$ is ensured by maintaining Cr content of both the base materials and the bonded joint at a specified level or higher.

(b) In the course of heating the base materials and the bonding material to perform the bonding, strong oxide films form on the surfaces of the both materials. Accordingly, bonding may preferably be performed by heating at the melting temperature of the bonding material or above so as to facilitate the removal of the oxide films. Hence, liquid-state diffusion bonding needs to be carried out. In this respect, the method of Invention 2 differs from that of Invention 1 which can be carried out regardless of whether the bonding material is melted or not.

(c) 0.2% yield strength (hereinafter referred to as "YS") of the bonded joint, equivalent to or higher than that of the base material, regarded most difficult for stainless steels to attain of all mechanical properties of the bonded joint, is ensured by restricting a length heated at 800° C. or above during liquid-state diffusion bonding.

(d) Bendability of the bonded joint, regarded as difficult to attain as YS, is ensured by restricting thickness of the bonding material, the compressive stress, and a length of time for heating the bonded layer within a limited range.

Reasons for restricting the conditions for the method of diffusion bonding according to the invention are described hereafter.

1. Invention 1

1) Lateral Expansion Ratio

In the method according to the invention, at a time of heating metallic materials butted against each other with the bonding material interposed between the end surfaces of the base materials, plastic deformation is caused to occur at the bonded joint 3 by applying the compressive stress in the longitudinal direction 5 of the base materials 12. A lateral expansion ratio of the base materials occurring at the bonded joint due to the plastic deformation is kept within the range of 1.0 to 1.1.

The reason for setting the lateral expansion ratio at 1.1 or less is to avoid the stress concentration caused by the discontinuity in shape at the bonded joint. On the other hand, in case that the lateral expansion ratio is less than 1.0, a bonded area at the bonded joint becomes smaller than a sectional area of the base materials, causing, for example, grooves or notches to occur on the surface at the bonded joint, which leads to a decrease in fatigue strength and bond strength of the bonded joint.

Generally, fatigue strength of a weldment formed by a normal welding method is controlled by the shape of a weld bead on a vertical cross sectional face perpendicular to the bead length and determined by the degree of the stress concentration. Same is true with the method of diffusion bonding in that fatigue strength of the bonded joint is controlled by the degree of the stress concentration. Accordingly, in case that there is a discontinuity in shape at the bonded joint 3, fatigue strength of the bonded joint decreases depending on the degree of the stress concentration. With the lateral expansion ratio kept in the range of 1.0 to 1.1, the degree of the stress concentration is limited within a permissible range. The lateral expansion ratio may preferably be set in the range of 1.02 to 1.08 for satisfying, with ample allowance, the requirements for sufficient bonding strength as well as fatigue strength thereof.

2) Heated Length

In the method according to the invention, a length heated at 800° C. or above, that is, the heated length 2 needs to be restricted to 3 to 20 mm for securing sufficient bonding strength in addition to fatigue strength thereof. This is because a decrease in the bonding strength can be held down to a minimum by restricting the heated length as described above to 20 mm or less since softening of the base materials due to the heating for bonding occurs at 800° C. or above. When the bonded joint is subjected to a tensile load, deformation occurs in the softened region in the vicinity of the bonded joint. The shorter the heated length, the shorter the length of a softened region of the bonded joint. On the other hand, in case that the heated length measures less than 3 mm, stable bonding can not be attained because temperature gradient becomes too steep at the localized region. Accordingly, the heated length is set in the range of 3 to 20 mm.

When heating a carbon steel at 800° C. or above, a dual phase (ferrite and austenite) co-existing temperature range is reached, and hence the heated length can be judged on the basis of a ratio of ferrite to austenite. Strict measurement of a length heated at 800° C. or above may be made by comparing microstructures of a material similar to the base material at several spots thereof, heated below 800° C., at 800° C., and above 800° C., respectively, with microstructures at various sites of the bonded joint.

When heating an austenite stainless steel, grain growth and solid solution of carbides on grain boundaries take place. Hence, approximate measurement may be made by observing only the microstructure of the bonded joint with an eye kept on the grain growth and carbides. Strict measurement can be made by the method described in the foregoing whereby a material similar to the base material is heated up to a temperature around 800° C. In the case of metallic materials other than steel, measurement of the heated length can be also made by keeping an eye on changes in the grain size. In the case of a martensitic stainless steel or a duplex stainless steel, this aspect will be referred to in describing Invention 2 hereafter. Means of observation may be an optical microscope or an electron microscope if necessary.

3) Method of Heating and Applying Stress

Figure 2:
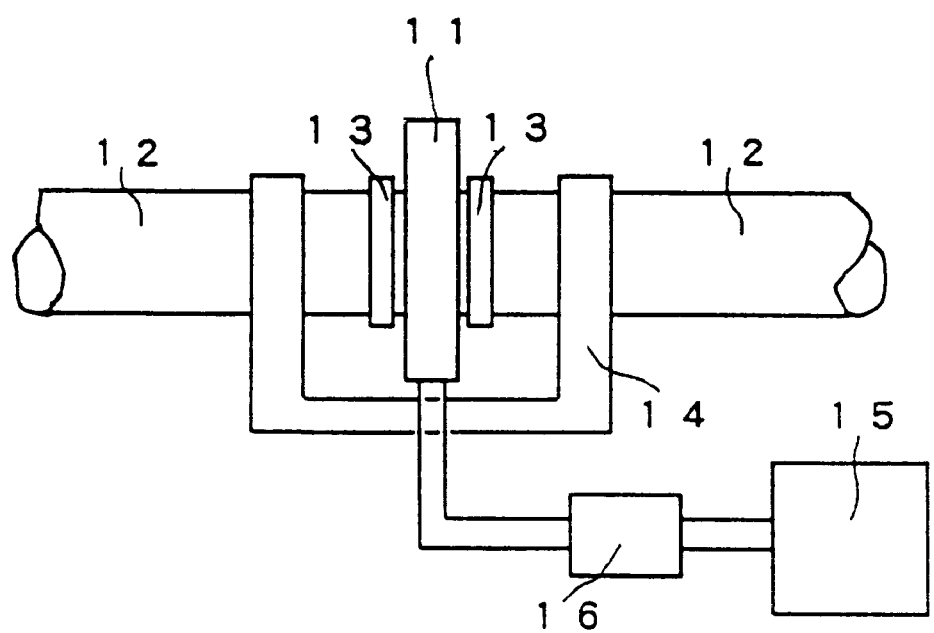
FIG. 2 is a schematic representation illustrating an apparatus used in carrying out the invention. Reference numeral 11 denotes a heating coil, also serving as gas shielding jig, 12 the base material (bar, pipe, or the like), 13 a cooling jacket, 14 a clamp, 15 a high frequency power source, and 16 a control panel.

FIG. 2 is a schematic representation illustrating the apparatus used in carrying out the invention. The apparatus comprises the heating coil of one turn 11, which is made of copper and serving also as gas shielding jig, the cooling jacket 13 fitted on the base materials 12 on both sides of the heating coil, the clamp 14 for applying the compressive stress, the high frequency power source 15, and the control panel 16.

A material with the melting point lower than that of the base materials is used as the bonding material. This applies to both Invention 1 and Invention 2. Liquid-state diffusion bonding is caused to occur by heating the bonding material at a temperature above the melting point thereof. The sound bonded layer is obtained with greater ease by a method of liquid-state diffusion bonding than by a method of solid-state diffusion bonding because of higher conformability of the bonding material with the end surface of the base material.

In Invention 1, a method of solid-state diffusion bonding is also an object of the invention. Even by the method of solid-state diffusion bonding, penetration and diffusion of alloying elements of the bonding material into the end surfaces of the base materials are promoted by applying the plastic deformation as described above, forming the strong bonded joint.

In the cases of both Invention 1 and Invention 2, a heating temperature for bonding is set at a temperature below the melting point of both base materials.

In carrying out the method of diffusion bonding according to the invention, there is a risk of the end surfaces of the base materials being oxidized when heated in the atmosphere. When the end surfaces of the base materials are oxidized, there are cases where defects occur at the bonded layer and the bonding strength is impaired. Accordingly, heating may preferably be performed in an inert gas atmosphere by feeding an inert gas into the gas shielding jig 11 shown in FIG. 2. Use of a nitrogen gas produces a similar effect to that in the case of using an inert gas. Invention 11 or Invention 12 relates to the method of diffusion bonding in such atmospheres as described above.

A preferable method of heating may be performed by high-frequency induction heating whereby the heated length as well as the atmospheres can be controlled with ease. Further, since in case of a high cooling velocity after bonding, the transformation hardening occurs depending on types of the base material, affecting the property of the bonded joint, a cooling velocity at the bonded joint may be regulated.

The heated length 2 can be controlled by adjusting a length of the heating coil 11, or by adjusting either a position of the cooling jacket 13 clutching the base materials or a cooling capacity (flow rate of cooling water) thereof.

It is essential to apply the compressive stress, that is, pressure in the longitudinal direction 5 of the base materials in order to cause the base materials to undergo a plastic deformation for preventing from occurrence of grooves or notches on the surface at the bonded joint, and also in order to cause the lateral expansion ratio to be at an appropriate value.

For applying the compressive stress, there is a method (A) of applying the force by use of the apparatus shown in FIG. 2, whereby the force is applied by clamping the base materials 12 with the clamp 14, and utilizing the reaction force accompanying the thermal expansion (adjusting the compressive force by partly releasing the reaction force accompanying the thermal expansion by the use of the spring), or the other method (B) of adjusting the compressive force by the use of the oil pressure. Invention 7 and Invention 8 relate to the aforesaid method (A), and Invention 9 and Invention 10 relate to the aforesaid method (B). The compressive force is applied only for a predetermined length of time during heating, and the compressive force is reduced or suspended after the lateral expansion ratio arrives at a predetermined value within the above described range. Judgment on whether or not the lateral expansion ratio has arrived at a predetermined value can be easily made by the naked eye or by use of a gauge when bonding is performed in the atmosphere. Lateral expansion occurring in the coil may be detected by fixing beforehand electrodes or the like at predetermined positions so that the expanded base materials due to lateral expansion come in contact with the electrodes, and by incorporating a sensor inside the coil, capable of sensing reduction in electrical resistance occurring as a result of the base materials coming into contact with the electrodes. In case that relationships between bonding conditions and the lateral expansion ratio are empirically established, the lateral expansion ratio may be regulated by setting in advance appropriate bonding conditions based on the experience.

4) Bonding Material

The bonding material for use in the method of diffusion bonding according to the invention is not restricted to any specific material as long as the melting point thereof is lower than that of the base materials, and is selectable as appropriate depending on quality and the like of the base material. As described in the foregoing, insert materials such as an amorphous or crystalline thin alloy strip may be used as the bonding material. These thin alloy strips may be self-made ones or ones available in the market. Invention 5 and Invention 6 relate to the method wherein the insert material is used as the bonding material.

The bonding material may be interposed manually between the base materials at a site of bonding work, or attached beforehand to the end surface of the respective base materials by the spot welding method or the forged bonding method. The bonding material may be the plated coating or plasma sprayed coating as described in the foregoing. These bonding materials may be attached to both ends or one end of each pipe. Several hundreds of pipes are bonded with each other in series to construct a pipe string of several thousands meters in total length.

5) Base Material

The base material according to the Invention 1 is not restricted to any particular metallic material. The base material may be bars such as reinforcing steel bar for use in reinforced concrete, pipes of various qualities, or other metallic materials. As described in the foregoing, in the case of the base material being a pipe, the pipe may be a straight pipe or coiled tubing. Also, the base materials to be bonded with each other are not restricted to an identical material or same kind of material, but may also be of different kind.

2. Invention 2

Reasons for restricting bonding conditions for the method of diffusion bonding according to Invention 2 are described hereafter.

1) Base Material

The base material for use in the method of diffusion bonding according to Invention 2 is a martensitic or a duplex stainless steel containing min. 9% of Cr. The base material containing less than 9% Cr can not have sufficient corrosion resistance in a $CO_2$ gas environment at 100° C. or below. Hence, Cr content is set at min. 9%. The upper limit of Cr content may preferably be 32% to ensure workability. Preferable range of alloying elements other than Cr are as follows:

C: 0.005~0.3%
Si: 0.02~2%
Mn: 0~3%
Cu: 0~3%
Ni: 0~10%
Mo: 0~4%
N: 0.001~0.3%
Pb: 0~0.5%

Trace elements such Al and the like may also be contained if necessary.

A martensitic stainless steel or a duplex stainless steel is selected as a base materials to provide sufficient corrosion resistance as well as YS thereof. Other classes of stainless steel, for example, an austenitic stainless steel can provide corrosion resistance, but not sufficient YS.

2) Bonding Material

An insert material, that is, an alloy strip from 10 to 80 $\mu$m thick with the melting point of 1150° C. or below may be used as the bonding material. The insert material, as described in the foregoing, is produced in the form of a strip by rapid solidification method. The plated coating deposited beforehand on the end surface of a stainless steel, or the sprayed film with thickness adjusted by grinding or the like after plasma spraying or after thermal spraying may be used as the bonding material. The plated coating or the sprayed film described above may be applied to one end only, or both ends of a pipe. In the case where the plated coating or the sprayed film is applied to the both ends of a pipe, an aggregate thickness of the plated coatings or the sprayed films at both ends of the pipe is set in the range of 10~80 µm.

For the coiled tubing described in the foregoing, the insert material is mainly used, but for other stainless steels, the plated coating or the sprayed films may also be used. However, in most cases, the insert material may preferably be used as the bonding material owing to handiness in use and its low production cost.

With the bonding material less than 10 µm in thickness, asperities on the end surfaces of the base materials can not be fully smoothed out, resulting in lowering of the bonding strength. On the other hand, with the bonding material exceeding 80 µm in thickness, a longer heating time is required for diffusion of elements such as Si, B, and the like, impairing bonding efficiency. When heating is applied for the limited period of time with use of such a thick bonding material, segregation of Si, B, and the like occurs in the bonded layer. Hence, corrosion resistance of the bonded joint can not be ensured.

Thickness of the bonded layer 1 includes that of the diffusion layer 4 as described in the foregoing. The thickness of the bonded layer 1 is desirable to be restricted to 80 µm or less because corrosion resistance at the bonded layer 1 is degraded in case that same exceed 80 µm. On the other hand, with the bonding layer 1 less than 0.5 µm in thickness, insufficient bonding may result, making sometimes it impossible to ensure sufficient strength. Hence, the thickness of the bonded layer 1 is desirable to be set at min. 0.5 µm. The bonding layer 1 may more preferably be set to be in the range of 2 to 50 µm for ensuring excellent corrosion resistance and bonding strength.

The thickness of the bonded layer 1 is measured using EPMA (Electron Probe Micro Analyser), IMMA (Ionprobe Mass Micro Analyser), and the like. It is also possible to measure the thickness by cutting the base material along a plane in parallel with the bonded layer 1 in sequence, and performing the spectrum analysis for the electric arc on respective cut surfaces.

In Invention 2, Cr content in the bonding material is specified at min. 5% because with Cr content less than 5%, sufficient corrosion resistance of the bonded layer can not be ensured. Although the upper limit of Cr content of the bonding material is not specified, Cr content may preferably be set at 38% or less owing to ease in handling the bonding material.

Use of Ni based alloy for a bonding material, having the chemical composition similar to that of the bonding materials as described hereafter in FIG. 4, suffices for keeping the melting point of the bonding material at 1150° C. or below. Preferable ranges of alloying elements are Cr: 5~38%, Mo: 0~5%, Si: 4~10%, and B: 0.5~4%, and other elements may be included as necessary.

Further, in case that the melting point is kept at 1150° C. or below, B content and Si content may be varied to the extent that an aggregate of B content and Si content does not exceed 12%.

3) Heating

The heated length 2 is restricted to 3 to 20 mm. This is because in case that the length heated at 800° C. or above exceeds 20 mm, YS and toughness of the base materials in the vicinity of the bonded joint are degraded while in case that same is less than 3 mm, a steep temperature gradient results in the localized areas and the stable bonding is not accomplished.

Heating so as to keep the heated length 20 mm or less is achieved by, for example, restricting a length of a coil 2 mm or less. As a result of such heating, the region heated at 800° C. or above consists of portions, each 10 mm or less in length on both sides of the bonded layer Heated length is confined by a 800° C.-plane at an equal distance from the bonded layer, that is, a 800° C.-plane perpendicular to the longitudinal direction of each stainless steel.

In bonding together steel pipes, it is preferable to provide a heating unit with a water cooling jacket 13 composed of material of high thermal conductivity. The water cooling jacket equipped on both sides of the heating unit restrict an increase in temperature of the respective steel pipes and the expansion of the heated region.

A heating temperature at the bonded layer is set to be at the melting point of the bonding material or above but below the melting point of the stainless steels, and a heating time is set to be 120 seconds or longer. In case that the heating temperature is at the melting point of the stainless steels or above, sound bonding is not accomplished. On the other hand, in case that the heating temperature is below the melting point of the bonding material, liquid-state diffusion bonding enabling rapid diffusion does not occur.

The heating retention time for 120 seconds or longer is necessary to ensure the adhesion of the end surfaces of stainless steels butted against each other, causes the sufficient diffusion of elements contained in the bonding material, and renders the chemical composition of the bonded layer as close to that of the stainless steels as possible, so that sufficient bonding strength, bendability, toughness, and corrosion resistance are obtained. Although there is no need for specifying the upper limit of the heating retention time, same may preferably be restricted to 600 seconds or less, because with the heating retention time exceeding 600 seconds, the heated length 2 may exceed the range thereof specified by the invention.

In the case of a joined structure according to Invention 4, composed of the base materials containing min. 9 wt % of Cr, the length heated at 800° C. or above is judged as follows depending on the microstructure of the base material. In the case of a duplex stainless steel, the base material is heated to a temperature region where dual phases of ferrite and austenite coexist as in the case of a carbon steel, and therefore the heated length can be measured with relative ease by means of observation of the microstructure using an optical microscope. It is also possible to measure the heated length using an electron microscope with an eye on carbides. In the case of a martensitic stainless steel, the base material is heated to a temperature region where dual phases of ferrite and austenite coexist or a temperature region where a single phase of ferrite only exists. When the base material is heated to a temperature region of the single phase of ferrite at around 800° C., an increase in a width of each ferrite lath accompanying annealing and solid solution of carbides occur, enabling measurement of the heated length by the electron microscope and the like.

4) Compressive Stress

Until a temperature of the bonded layer reaches the melting point of the bonding material, a small compressive stress enough for holding the bonding material may suffice. With the temperature at the melting point of the bonding material or above, the compressive stress at the end surface of the respective base materials, butted against each other, needs to be in the range of 0.5 to 2 kgf/mm². In case that the compressive stress is less than 0.5 kgf/mm², the sufficient adhesion across the bonding surface is not maintained during bonding while in case that the compressive stress exceeds 2 kgf/mm², excessive deformation takes place at the bonded joint, and as a result, the bonded joint fails to take a streamlined shape with the lateral expansion ratio 1.0~1.1, causing corrosive fluid to stagnate therein. As this may cause the growth of localized corrosion, the compressive stress is to be kept in the range of 0.5 to 2 kgf/mm². In case of large deformation occurring due to the compressive stress exceeding 2 kgf/mm², the stress concentration occurs in the regions of deformation, degrading bendability as well.

The application of the compressive stress may be synchronized with heating for the same retention time of 120 seconds or longer as that for heating, or terminated when solidification of the bonding material occurs due to a rise in the melting point thereof in molten phase, and thereafter heating only is continued.

EMBODIMENTS

[Embodiment 1]

The effect of Invention 1 is described hereafter with reference to Embodiment 1. A seamless steel pipe having chemical composition of 0.24% C, 0.25% Si, 1.13% Mn, 0.48% Cr, 0.026% Ti, and balance substantially Fe, 130 mm in outside diameter and 15 mm in wall thickness, treated by quenching (quenching temperature at 950° C.) and tempering (tempering temperature at 620° C.) was used as the base material. The steel pipe had tensile strength of 860 MPa.

As the bonding material, an insert material of an alloy strip (as referred to in Invention 5) 30 μm thick and having the melting point at 1140° C. and chemical composition of 1.4% B, 7.3% Si, 5.3% Cr, and balance Ni was used.

Diffusion bonding was carried out under a nitrogen gas shield with the conditions of a temperature at the bonded layer 1 being 1250° C. and heating for a retention time of 300 seconds. Heating was applied by means of the high frequency induction heating system with the conditions that a width of the heating coil was varied within a range of 10 to 50 mm, and at the same time, the cooling capacity was varied by providing the cooling jacket on the both sides of the heating coil. By means of such heating, the heated length was caused to vary.

The lateral expansion ratio at the bonded joint was caused to vary by changing the compressive stress. The compressive stress was adjusted by the method (B), using the oil pressure, described in the foregoing, that is, the method adopted in Invention 9. For detection of the lateral expansion ratio, the aforesaid sensor activated on the basis of changes in electric resistance was used.

After bonding, testpieces, each including the bonded layer 1 in the middle, for tensile test, bending test, and fatigue test were prepared, and subjected to various tests. Shapes of testpieces for tensile test and bending test were in accordance with JIS Z 2201 and JIS Z 2204, and testing methods JIS Z 2242 and JIS Z 2248.

Fatigue tests were carried out by the 4-point bending method, and the numbers of cycles to occurrence of breaking (fatigue life) at 200 MPa of the maximum bending stress were examined.

FIG. 3 is a table showing the lateral expansion ratio, heated length, and the results of the tests described above.

In FIG. 3, test No. 1 and 2 demonstrate excellent YS and fatigue life, and good bendability as well.

In the case of test No. 3 as a comparative example, the bonded joint underwent excessive deformation, and the lateral expansion ratio exceeded the specified range in the invention. It will be noted that the bonding strength was good, but the fatigue life is less by an order of magnitude than that for the tests representing the embodiments of the invention, showing clearly the effect of the stress concentration.

In the case of test No. 4 as another comparative example, the heated length was in excess of the specified range in the invention. It will be noted that the fatigue life in this case is less than that for the test according to the embodiments of the invention, and the YS of the bonded joint is considerably lower than that in the case of the embodiments of the invention.

[Embodiment 2]

The effect of Invention 2 is then described with reference to Embodiment 2.

FIG. 4 shows chemical composition of insert materials (referred to in Invention 6) used as the bonding material in tests.

The insert materials were thin steel strips produced by a rapid quenching method wherein molten steel with chemical composition adjusted is dropped on the surfaces of rotating rolls. Thickness of the respective thin steel strips were controlled by the dropping rate of the molten steel and rotating velocity of the rolls and are shown in FIG. 6.

FIG. 5 shows chemical composition and YS of martensitic and duplex stainless steel pipes. All these steel pipes were seamless steel pipes 130 mm in outside diameter and 15 mm in wall thickness.

As in the case of embodiment 1, diffusion bonding was carried out in the apparatus, which was prepared by modifying the one shown in FIG. 2. Adjustment of the heated length was made by varying the width of the heating coil in the range of 10 to 50 mm as well as the cooling capacity of the cooling jacket 13, which encompasses the steel pipe 12 and is circulated by cooling water therein, equipped on the both sides of the heating coil.

The compressive stress was applied by the two methods, described in the foregoing, that is, the method (A) of utilizing the reaction force accompanying the thermal expansion (Invention 8) and the method (B) of using oil pressure (Invention 10).

Diffusion bonding was carried out by placing steel pipes with the insert material interposed between the end surfaces of stainless steel pipes in said apparatus, and maintaining heating and applying the compressive stress for a predetermined retention time.

FIG. 6 shows various combination of the insert materials and steel pipes, conditions of bonding.

The testpieces were taken from the bonded joint formed on aforesaid conditions, and were subjected to tensile test, bending test, and corrosion cracking test. Testpieces for the bending test and the corrosion cracking test were prepared to a specified thickness so that the center of thickness of each testpiece corresponds to the center of wall thickness of each steel pipe.

Figure 7:
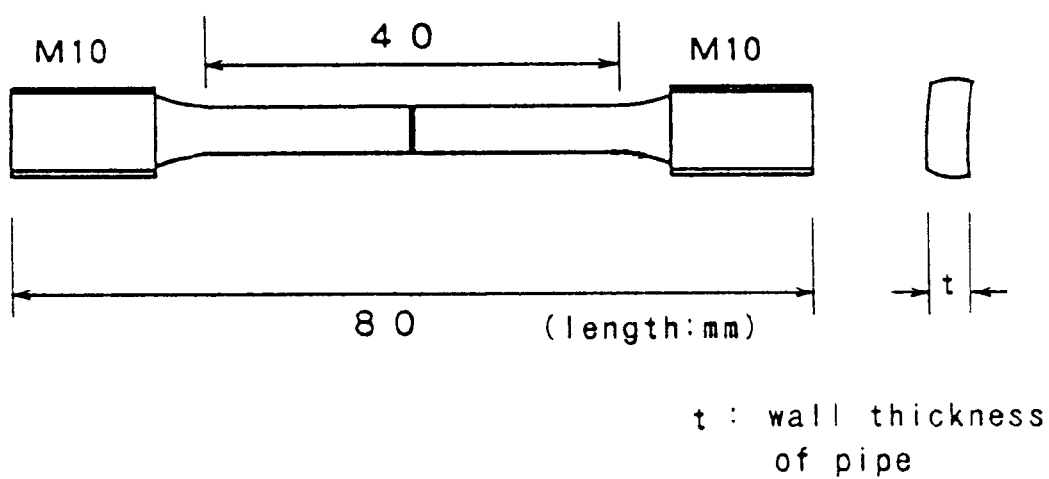
FIG. 7 is a view showing the shape of a testpiece used in a tensile test carried out on the bonded joint.

FIG. 7 illustrates a shape of the testpiece for the tensile test.

FIG. 8($a$) is a view showing a shape of the testpiece for the bending test, and FIG. 8($b$) a shape of the testpiece after the bending test.

FIG. 9($a$) is a view showing a shape of the testpiece for the corrosion cracking test, and FIG. 9($b$) is a sectional view showing the testpiece under a load in a humid $CO_2$ gas environment at the corrosion cracking test and a jig used at the test. The testpiece is bent at the center thereof so that a stress is loaded thereto up to 100% of the YS of the base material.

Corrosion resistance in the humid $CO_2$ gas environment containing a trace of $H_2S$ was evaluated by this test. The humid $CO_2$ gas environment containing a trace of $H_2S$ was simulated by a 5% NaCl aqueous solution saturated with a mixture of $H_2S$ gas of partial pressure 0.001 MPa and $CO_2$ gas of partial pressure 3.0 MPa. The test temperature is adopted 25° C. for a martensitic stainless steel, or 80° C. for a duplex stainless steel at which the highest susceptibility to corrosion cracking was observed, as disclosed in Japanese Patent Laid-open Publication No. Hei 6-7967. The test was run for 336 consecutive hours, and the results of the tests other than those undergoing cracking were marked "Yes" in FIG. 6.

FIG. 6 shows bonding conditions for the tests and test results thereof. The results of the tests applied by the methods of the invention showed YS exceeding the YS of the base materials in FIG. 5, and were not found to undergo cracking in the bending test and corrosion cracking test.

As opposed to the aforesaid tests, test B1, comparative example, showed a high YS reflecting a large compressive stress, but an insufficient bendability and corrosion cracking resistance. Another test B2, comparative example, was marked "Yes" in the bending test due to a long heating region during bonding, but marked "No" in the tensile test and corrosion cracking test.

In the cases of other comparative examples, test B3, B4, B5, and B6 showed unsatisfactory results in the tensile test and corrosion cracking test due to a too low heating temperature(B3), a short heating retention time(B4), an insufficient compressive stress(B5), and an excessively thick insert material(B6), respectively.

The test results described above demonstrate that the bonded joints formed by the methods according to the invention had YS exceeding the YS of the base materials, and excellent bendability and corrosion cracking resistance.

INDUSTRIAL APPLICABILITY

According to the invention, a bonded joint having excellent fatigue strength and bonding strength is obtained by a simple method of restricting the lateral expansion ratio and the heated length within an appropriate range. Furthermore, with use of said method, it is possible to form a bonded joint having excellent strength and bendability as well as corrosion resistance equivalent to or higher than that of the base material, in a humid $CO_2$ gas environment containing a trace of $H_2S$. Therefore, the method of diffusion bonding according to the invention offers basic and effective technologies to the industries wherein bonding of metallic materials is essential. Specifically, the invention will make great contribution to the industry using oil countries tubular goods, particularly, coiled tubing.

What is claimed is:

1. A method for joining metallic materials by diffusion bonding to form a bonded joint having excellent fatigue strength and bonding strength, said method comprising steps of:
    (a) interposing a bonding material between base materials butted against each other;
    (b) heating a portion to be bonded, so that the length heated at a temperature of 800° C. or above measures from 3 to 20 mm;
    (c) applying a compressive stress in the longitudinal direction of the base materials and causing plastic deformation so that a lateral expansion ratio is made within the range of 1.0 to 1.1 at the bonded joint; and
    (d) thereby joining said base materials.

2. A method for joining stainless steels containing the minimum 9 wt % of Cr, by diffusion bonding to form a bonded joint having excellent fatigue strength, corrosion resistance in a humid $CO_2$ environment containing a trace of $H_2S$, and bonding strength, said method comprising steps of:
    (a) interposing a bonding material, which is Ni-based alloy from 10 to 80 μm in thickness containing the minimum 5 wt % of Cr and having the melting point at 1150° C. or below, between stainless steels butted against each other;
    (b) heating a portion to be bonded so that the length heated at a temperature of 800° C. or above measures from 3 to 20 mm, and keeping the bonded layer at a temperature within a range between the melting point of the bonding material and the melting point of stainless steel for a retention time of 120 seconds or longer;
    (c) applying a compressive stress in the longitudinal direction of stainless steel, from 0.5 to 2 kgf/mm$^2$ at the butted surface of the stainless steels and causing plastic deformation so that a lateral expansion ratio is made within the range of 1.0 to 1.1 at the bonded joint; and
    (d) thereby joining said stainless steel.

3. A joined structure, having the bonded joint formed by the method according to claim 1.

4. A joined structure, having the bonded joint formed by the method according to claim 2.

5. A method for joining metallic materials according to claim 1, wherein an insert material, which is composed of a metallic crystalline strip or a metallic amorphous strip, is used as the bonding material.

6. A method for joining metallic materials according to claim 2, wherein an insert material,which is composed of a metallic crystalline strip or a metallic amorphous strip, is used as the bonding material.

7. A method for joining metallic materials according to claim 1, wherein the compressive stress is applied, by clamping both base materials and adjusting a reaction force accompanying a thermal expansion by a use of the spring.

8. A method for joining stainless steels according to claim 2, wherein the compressive stress is applied, by clamping both stainless steels and adjusting a reaction force accompanying a thermal expansion by the use of a spring.

9. A method for joining metallic materials according to claim 1, wherein the compressive stress is applied by the use of oil pressure.

10. A method for joining stainless steels according to claim 2, wherein the compressive stress is applied by the use of oil pressure.

11. A method for joining stainless steels according to claim 1, wherein diffusion bonding is performed in an atmosphere of either an inert gas, a nitrogen gas, or a mixture of both gases.

12. A method for joining stainless steels according to claim 2, wherein diffusion bonding is performed in an atmosphere of either an inert gas, a nitrogen gas, or a mixture of both gases.

* * * * *